United States Patent

Kardach et al.

[11] Patent Number: 5,862,389
[45] Date of Patent: Jan. 19, 1999

[54] METHOD AND APPARATUS FOR SELECTIVELY INVOKING A PARTICULAR INTERRUPT SERVICE ROUTINE FOR A PARTICULAR INTERRUPT REQUEST

[75] Inventors: James P. Kardach, Saratoga; Sung Soo Cho, Sunnyvale; Jayesh M. Joshi, Santa Clara, all of Calif.

[73] Assignee: Intel Corporation, Santa Clara, Calif.

[21] Appl. No.: 778,516

[22] Filed: Jan. 3, 1997

Related U.S. Application Data

[63] Continuation of Ser. No. 395,051, Feb. 27, 1995, abandoned.
[51] Int. Cl.⁶ .................................................. G06F 13/24
[52] U.S. Cl. ........................... 395/739; 395/734; 395/741
[58] Field of Search ..................................... 395/736, 739, 395/741, 742, 733, 866, 867, 868

[56] References Cited

U.S. PATENT DOCUMENTS

| | | | |
|---|---|---|---|
| 5,101,497 | 3/1992 | Culley et al. ............................ | 395/734 |
| 5,261,107 | 11/1993 | Klim et al. ............................... | 395/739 |
| 5,303,364 | 4/1994 | Mayer et al. ............................ | 395/425 |
| 5,357,628 | 10/1994 | Yuen ........................................ | 395/575 |
| 5,404,535 | 4/1995 | Barlow et al. ........................... | 395/737 |
| 5,410,710 | 4/1995 | Sarangdhar et al. . | |
| 5,423,045 | 6/1995 | Kannan et al. .......................... | 395/750 |
| 5,428,794 | 6/1995 | Williams ................................. | 395/733 |
| 5,437,039 | 7/1995 | Yuen ........................................ | 395/733 |
| 5,471,618 | 11/1995 | Isfeld ....................................... | 395/839 |
| 5,471,620 | 11/1995 | Shimizu et al. ......................... | 395/375 |
| 5,481,725 | 1/1996 | Jayakumar et al. .................... | 395/725 |
| 5,506,019 | 4/1996 | Narad ...................................... | 395/733 |
| 5,530,891 | 6/1996 | Gephardt ................................ | 395/800 |
| 5,542,076 | 7/1996 | Benson et al. .......................... | 395/733 |
| 5,551,044 | 8/1996 | Shah et al. .............................. | 395/750 |
| 5,555,420 | 9/1996 | Sarangdhar et al. ................... | 395/739 |
| 5,560,019 | 9/1996 | Narad ...................................... | 395/733 |
| 5,564,060 | 10/1996 | Mahalingaiah et al. ............... | 395/871 |
| 5,566,334 | 10/1996 | Loader .................................... | 395/650 |
| 5,613,128 | 3/1997 | Nizar et al. ............................. | 395/739 |
| 5,619,705 | 4/1997 | Karnik et al. ........................... | 395/739 |
| 5,634,130 | 5/1997 | Lee ......................................... | 395/733 |

*Primary Examiner*—Meng-Ai T. An
*Assistant Examiner*—Raymond N Phan
*Attorney, Agent, or Firm*—Blakely, Sokoloff, Taylor & Zafman LLP

[57] ABSTRACT

A circuit for selectively invoking a particular interrupt service routine to handle a particular interrupt request. The present invention includes a programmable register with one or more bits per interrupt request input. The present invention also includes interrupt selection logic which outputs a particular interrupt in response to an interrupt request input and data stored in the programmable register. The interrupt then invokes the associated interrupt service routine to handle the interrupt request. The present invention is used to choose the interrupt service routine to handle a particular interrupt request from any source within the computer system in any computer system operating mode.

20 Claims, 7 Drawing Sheets

METHOD AND APPARATUS FOR SELECTIVELY INVOKING A PARTICULAR INTERRUPT SERVICE ROUTINE FOR A PARTICULAR INTERRUPT REQUEST

This is a continuation of application Ser. No. 08/395,051, filed Feb. 27, 1995, now abandoned.

FIELD OF THE INVENTION

The present invention relates to the field of computer systems. Specifically, the present invention relates to selectively invoking a particular interrupt service routine for a particular interrupt request or exception.

BACKGROUND OF THE INVENTION

One of the keys to effective communication between different computer system components and sharing of computer resources is the use and handling of interrupt requests. Interrupt requests indicate that the requester, often a computer system component, requires some sort of attention or service. Interrupt requests as discussed herein include primarily hardware interrupt requests. Hardware interrupt requests occur as a result of an external event such as a request for service from an input/output (I/O) device.

The computer system responds to an interrupt request by invoking an interrupt service routine. The computer system must also use some sort of prioritization scheme if multiple interrupt requests are generated concurrently. Interrupt requests are generated for many different reasons from many different sources and require a variety of responses from the computer system. The computer system may have several interrupt service routines available, each having different capabilities. One interrupt service routine may always have complete system information so that the system can reliably be returned to the same state as before the interrupt request. Another interrupt service routine may not have complete system information, but it is able to service an interrupt very quickly. Thus, individual service routines may be better suited to handle certain types of interrupt requests.

Some computer systems also employ a variety of different modes in which the computer system may operate. A particular system mode may require its own software and have its own method of handling interrupts. An example of an alternative system mode with these characteristics is System Management Mode or SMM. SMM was developed by Intel Corporation of Santa Clara, Calif., the corporate assignee of the present invention.

In many cases, where a computer system makes use of a system mode that has its own interrupt service routine associated with it, the system designer or OEM must choose one interrupt service routine to service all interrupt requests from a particular source. The "source" in this case may be a particular bus in the computer system such that all interrupt requests passed on that bus must be serviced by the chosen interrupt service routine. The designer must choose the interrupt service routine that will service all of the interrupt requests from that source regardless of whether some interrupt request events might be better serviced with an alternate interrupt service routine.

In prior art systems using SMM, for example, system designers or OEMs choose one type of interrupt service routine to service all power management interrupt requests. Thus, even though a variety of different types of interrupt requests are generated, one interrupt service routine must be selected to handle all power management interrupt requests. Servicing all power management interrupt requests with one interrupt service routine has a number of drawbacks, all of which can lead to degradation of overall computer system performance.

A computer system employing SMM, for example, may service all power management interrupt requests with the system management interrupt (SMI) service routine. The SMI service routine has the advantages of being transparent to other applications running in the computer system and allowing for input/output (I/O) restarts, but switching into and out of SMM requires many computer cycles. Thus, if the SMI service routine is used to service all power management interrupt requests and the computer system must shift into and out of SMM frequently, the impact on computer system performance is significant. Additionally, the SMI service routine may not have all of the system information necessary to restore the system to its original state after servicing the interrupt.

Alternatively, if an operating system interrupt service routine, for example NMI (non-maskable interrupt) or INTR (maskable interrupt), is chosen to service all power management interrupt requests, the interrupts may interfere with other application events and cause applications to fail. Also, NMI and INTR do not provide for I/O (input/output device) restarts which are essential for effective power management.

Although a computer system using SMM and power management has been provided as an example, other prior art computer systems have similar issues with respect to handling interrupt requests. Prior art computer systems do not provide the system designer or OEM with the flexibility to select the interrupt service routine best able to service a particular interrupt request in all computer system modes.

The present invention provides for the selection of the interrupt service routine best able to handle a particular interrupt request. The present invention provides for the selection of the interrupt service routine for a particular interrupt request from any source, independent of the mode in which the computer system is operating.

SUMMARY OF THE INVENTION

A method and apparatus for selectively invoking a particular interrupt service routine to handle a particular interrupt request from any source or generated while operating in any computer system mode is described. The present invention includes a programmable register with one or more bits per interrupt request type. The present invention also includes interrupt selection logic which outputs a particular interrupt in response to an interrupt request and data stored in the programmable register. The interrupt then invokes the associated interrupt service routine to handle the interrupt request.

BRIEF DESCRIPTION OF THE DRAWINGS

The present invention will be understood more fully from the detailed description given below and from the accompanying drawings of embodiments of the invention, which, however, should not be taken to limit the invention to the specific embodiments, but are for explanation and understanding only.

DETAILED DESCRIPTION OF THE PRESENT INVENTION

A method and apparatus for selectively invoking a specific interrupt service routine to handle a particular interrupt service request from any computer system mode or source is described. In the following description, numerous specific details are set forth, such as types of interrupts, computer system modes, specific computer system components, etc., in order to provide a thorough understanding of the present invention. However, it will be apparent to one skilled in the art that the present invention may be practiced without these specific details. In other instances, well known structures, circuit blocks, interfaces, and architectural functions have not been described in detail in order to avoid obscuring the present invention.

Overview of the Computer System of the Present Invention

Figure 1:
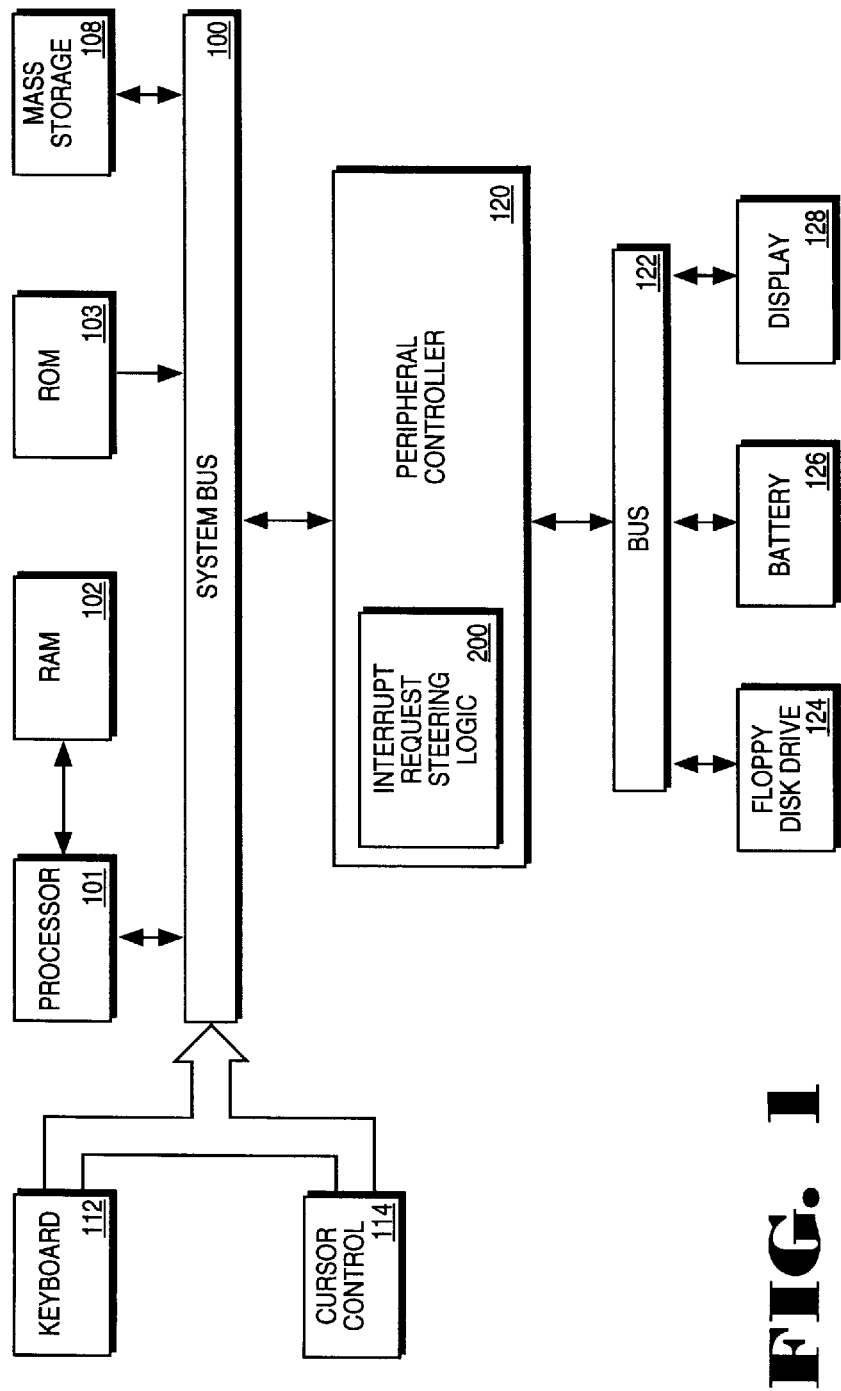
FIG. 1 is a high-level block diagram of one embodiment of the computer system of the present invention.

Referring to FIG. 1, one embodiment of a computer system in which the present invention operates is illustrated. Such computer systems, as illustrated in FIG. 1, comprise a bus 100 for communicating information, a processor 101 coupled with the bus 100 for processing information, a random access memory (RAM) 102 coupled with the processor 101 for storing information and instructions for the processor 101, and a read only memory (ROM) 103 coupled with the bus 100 for storing static information and instructions for processor 101.

The computer system of the present invention may also include a peripheral controller 120 coupled to bus 100 for controlling direct memory access (DMA), power management and other features related to management of computer system peripherals. The present invention comprises interrupt request steering logic 200. Interrupt request steering logic 200 will be described in more detail below with reference to FIGS. 2–7. In one embodiment, interrupt request steering logic 200 of the present invention is configured on peripheral controller 120. The peripheral controller 120 is also coupled to bus 122 for communicating peripheral information. Optionally, the computer system of the present invention may also include a floppy disk drive 124, a battery 126 and a display 128, all coupled to bus 122. Additional devices such as mass storage device 108, keyboard 112 or other input device and cursor control 114 may also be included in the computer system of the present invention.

In one embodiment of the present invention, processor 101 is an Intel® Architecture Microprocessor such as manufactured by Intel Corporation of Santa Clara, Calif., the corporate assignee of the present invention. Other processors such as PowerPC™, Alpha™, etc. processors may also be used.

It will be apparent to those skilled in the art that other computer systems may be used with the present invention. Similarly, it will be apparent to those skilled in the art that the computer system illustrated in FIG. 1 may include additional components not illustrated in FIG. 1 or may be configured without components that are illustrated in FIG. 1.

The Interrupt Selection Logic of the Present Invention

Figure 2:
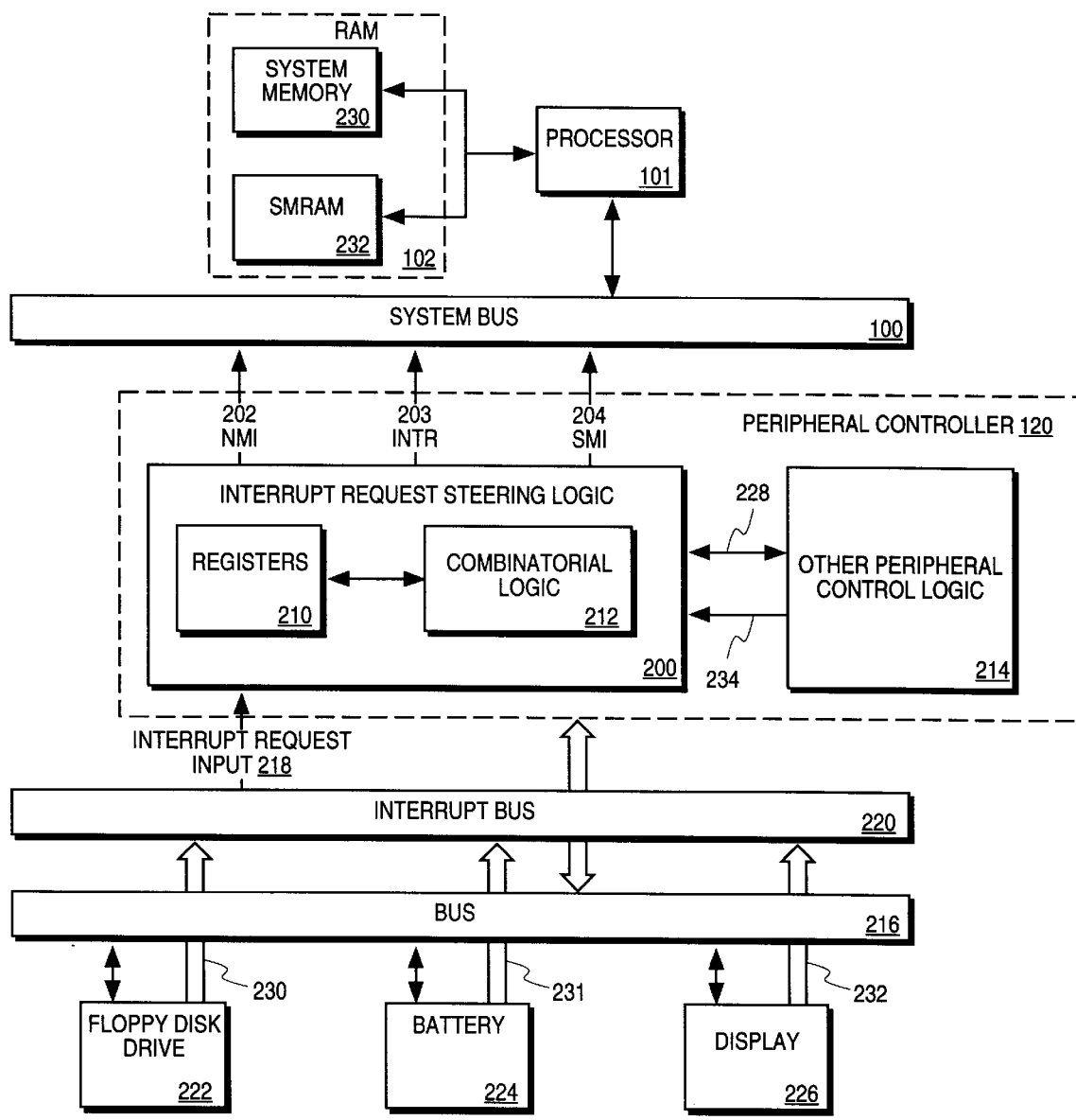
FIG. 2 is a block diagram of the arrangement of the processor and the interrupt request steering logic in one embodiment of the present invention.

Referring now to FIG. 2, the arrangement of the processor 101 and the peripheral controller 120 of one embodiment of the present invention are illustrated. As described above, processor 101 and peripheral controller 120 are coupled to system bus 100. Processor 101 is also coupled to RAM 102 as shown in FIG. 1. In one embodiment of the present invention, RAM 102 includes both system memory 230 and system management RAM (SMRAM) 232. SMRAM 232 is static memory used primarily in System Management Mode (SMM) of the computer system. SMM is a low power mode often used in notebook and laptop computers and is well known to those of ordinary skill in the art. SMM is described in detail in the book by Desmond Yuen, *Intel's SL Architecture: designing portable applications*, published by McGraw Hill, Inc. in 1993. SMRAM 232 stores instructions and data that are used primarily for SMM functions although SMRAM 232 is also accessible in other computer system modes with the use of more complex instructions.

As mentioned above, in one embodiment, the interrupt request steering logic 200 of the present invention is configured on the peripheral controller 120. In alternative embodiments, the interrupt request steering logic 200 is configured on a discrete programmable interrupt controller device or other computer system component.

On the peripheral controller 120, interrupt request steering logic 200 is coupled to other peripheral control logic 214 via signal lines 228 and interrupt request input 234. Interrupt request steering logic 200 includes registers 210 and combinatorial interrupt selection logic 212. The peripheral controller 120 and thus, the interrupt request steering logic 200 and other peripheral control logic 214, are coupled to the system bus 100, and bus 216. Floppy disk drive 222, battery 224, and display 226 are also coupled to bus 216. In one embodiment of the present invention, bus 216 comprises a system management bus (SMB). SMB is a two wire, bi-directional bus used in some systems for passing power management messages.

Still referring to FIG. 2, floppy disk drive 222, battery 224, display 226, and interrupt request steering logic 200, are also coupled to interrupt bus 220. In one embodiment, interrupt bus 220 is a serial interrupt bus (SIB) used to pass interrupt requests. Interrupt bus 220 receives hardware interrupt requests or power management events from floppy disk drive 222, battery 224, and display 226 over signal lines 230–232 respectively. Floppy disk drive 222, battery 224 and display 226 are examples of computer system components which may generate hardware interrupt requests or power management events. It will be apparent to one of ordinary skill in the art that other devices may be coupled to interrupt bus 220.

Hardware interrupt requests or power management events generated by the above-mentioned components are transmitted over interrupt bus 220 to interrupt request input line 218 and operated on by interrupt request steering logic 200 of the present invention. Interrupt request steering logic 200 may also receive interrupt requests or power management events directly from other peripheral control logic 214 via interrupt request input 234. Interrupt requests and/or power management events received directly from other peripheral control logic 214 are operated on by interrupt request steering logic 200 in the same manner as interrupt requests and power management events received on interrupt request input line 218. Thus, all references herein to interrupt requests and power management events received by interrupt request input line 218 in the descriptions below, may be applied equally to interrupt requests and power management events received from other peripheral control logic 214 via interrupt request input 234.

Power management events are computer system events that operate to manage the overall power consumption of the computer system. Power management events include, for example, requests from various devices such as the computer display or the hard disk drive to shut down after being idle for a predetermined amount of time, to restart, or to change to a lower power operation mode. The operation of interrupt request steering logic 200, including registers 210 and combinatorial interrupt selection logic 212 will be described in more detail below with reference to FIGS. 3, 5 and 6.

To provide further clarity to the following description, it should be noted that the term "interrupt request" is used herein to describe a request for service from any interrupt request source in the computer system. The term "interrupt" is used herein to describe the output of the interrupt steering logic or programmable interrupt controller of the present invention in response to an interrupt request. The interrupt invokes an interrupt service routine to service the interrupt request.

"Interrupt request type" is used herein to refer to a request for the same service from the same device. Thus, a computer display screen requests service in the form of an interrupt request. The computer display may request to be shut down (one interrupt request type) or it may request to be restarted (a different interrupt request type). Requests for the same service, shutting down, for example, may be classified as still different interrupt request types where the interrupt requests are issued by a different device such as a modem. Alternatively, "interrupt request type" may also refer herein to all interrupt requests that will be serviced in the same manner in the same relative priority. Using this definition, one interrupt request type may include interrupt requests from different devices for the same type of service.

Referring still to FIG. 2, in response to an interrupt request via interrupt request input line 218 or interrupt request input line 234 (for on-chip interrupt requests or power management events), the interrupt request steering logic 200 outputs one of the interrupts available in the computer system. In one embodiment, the possible interrupts include a non-maskable interrupt (NMI), a maskable interrupt (INTR), and a system management interrupt (SMI) which are output over output lines 202–204 respectively. Alternative embodiments have a different number of interrupts available in the computer system. The interrupt output 202, 203 or 204 then invokes the associated interrupt service routine to service the pending interrupt request. In one embodiment, the interrupt service routines are stored in the system or main memory 230 and system management random access memory (SMRAM) 232.

Figure 3:
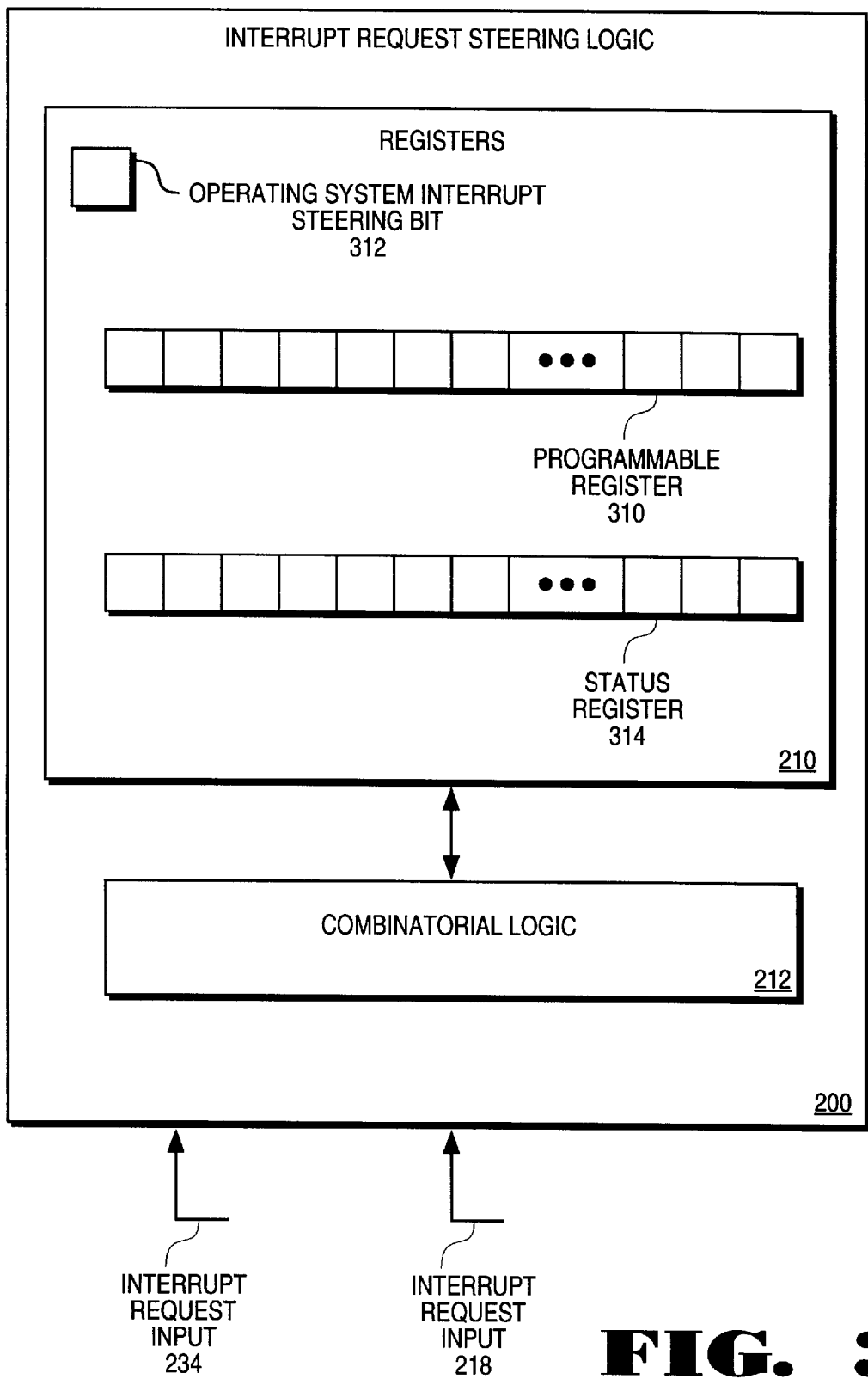
FIG. 3 is a block diagram of the interrupt request steering logic of one embodiment of the present invention.

Referring now to FIG. 3, the programmable register 310 of the present invention is illustrated. Programmable register 310 is configured on the interrupt request steering logic 200 in one embodiment of the present invention. In one embodiment, programmable register 310 includes one programmable bit per possible interrupt request type. In other words, programmable register 310 includes one bit for each and every type of interrupt request that can be received by interrupt request inputs 218 or 234. Alternative embodiments of the present invention include more than one bit per interrupt request type that may be received by interrupt request input 218 or interrupt request input 234. The operating system and other computer system software include the information that associates each interrupt request type in the computer system with the appropriate bit or bits in the programmable register 310.

Programmable register 310 is programmed by the system designer, manufacturer, OEM, or other person through the computer system BIOS (basic input/output system firmware). The general operation and use of BIOS is well known to those of ordinary skill in the art. Programmable register 310 is given a specific address in the system so that its contents can be programmed or initialized when the computer is turned on and booted up. The BIOS programmer or system designer determines, based on a number of factors, which system interrupt service routine should handle each specific interrupt request type. These factors may include but are not limited to the following: a) which interrupt service routine has more knowledge about servicing the particular interrupt request, b) which interrupt service routine can service the interrupt request most quickly, and c) which interrupt service routine can service the interrupt request without adversely affecting other applications running on the system.

Interrupt priority handling is also a factor that may be used to determine which service routine is best suited to service a particular interrupt request type. Different interrupt types or interrupt request types may be assigned different priorities in the computer system such that certain interrupts or interrupt requests are always serviced according to a specified priority in relation to other interrupt service requests. In one embodiment, interrupt priority handling is managed by the programmable interrupt controller in conjunction with computer system software and firmware.

Once the BIOS programmer has determined which interrupt service routine is best suited to service the particular interrupt request based on the above or other criteria, he or she programs the register through the BIOS. In one embodiment, the logical values programmed into the individual bits of programmable register 310 determine whether the interrupt request type or types associated with that bit will be serviced by an operating system interrupt service routine (NMI or INTR in the example provided above) or a system management interrupt service routine. The method of programming computer system registers through BIOS is well known to those of ordinary skill in the art.

Still referring to FIG. 3, one embodiment of the present invention also includes an additional programmable bit referred to as an operating system interrupt steering bit 312. In one embodiment, as described above, programmable register 310 indicates whether a particular interrupt request type will be serviced by an operating system interrupt service routine or a system management interrupt service routine. In this embodiment, where there are two or more operating system interrupt service routines, operating system interrupt steering bit 312 determines which operating system interrupt service routine will be invoked. In the example provided above, the operating system interrupt steering bit 312 is programmed to one value if an INTR interrupt is to be output and another if an NMI is to be generated. In one embodiment, there is only one operating system interrupt steering bit 312 such that all interrupt request types that are to be serviced by an operating system interrupt service routine are serviced by the same operating system interrupt service routine. Thus, in this embodiment, all interrupt requests that are serviced by an operating system interrupt service routine are serviced by the same operating system interrupt service routine. In an alternative embodiment, the present invention includes an operating system interrupt steering bit 312 for each interrupt request type such that different interrupt request types invoke different operating system interrupt service routines.

Programmable register 310 and the operating system interrupt steering bit 312 determine which interrupt service routine will handle a particular interrupt service request. Status register 314 is also included in the interrupt steering logic 200 in one embodiment of the present invention. Status register 314, like programmable register 310, comprises one or more bits per type of interrupt request received on interrupt request input 218 or interrupt request input 234. When an interrupt request occurs, the bit in status register 314 associated with that particular interrupt request is set. Once the interrupt request has been serviced by the appropriate interrupt service routine, the bit is cleared by the service routine that serviced the interrupt request. Thus, the status register 314 indicates when an interrupt request is being serviced and when that service is complete so that another interrupt request can be serviced. As with programmable register 310, the operating system or other system software stores the information indicating which particular bit or bits are associated with each interrupt request type from each possible source of interrupt requests.

In one embodiment, interrupt requests and power management events are logically "OR'd" together such that an interrupt request is asserted on interrupt request input 218 or interrupt request input 234 when an interrupt request or power management event occurs. If more than one interrupt request and/or power management event occurs at the same time and the interrupt service routine only handles one of the requests or events, another interrupt request is asserted on interrupt request input line 218 or interrupt request input 234 invoking the appropriate interrupt service routine.

In one embodiment, there is one bit in status register 314 for each interrupt request type. However, there may be one or more possible interrupt request types that require two interrupt service routines to service the particular interrupt request. In this case, there are two bits in status register 314 for such interrupt request types. An example of such an event in SMM is the ASMI (automatic system management interrupt). Two bits are provided in status register 314 so that an ASMI interrupt request can invoke the SMI interrupt service routine and subsequently invoke an operating system interrupt service routine. This capability to provide nested interrupt service routine calls can be important in computer systems which make use of power management and other such modes. The use of nested interrupt service routine calls provides for message passing between two or more computer system modes. Thus, for example, where the computer system is shutting down, the use of nested interrupt service routine calls allows software in all computer system modes, SMM and non-SMM in this example, to ensure that it is safe to shut down the computer. It will be apparent to one of ordinary skill in the art that nested interrupt service routine calls can be useful in a variety of different circumstances.

Figure 4:
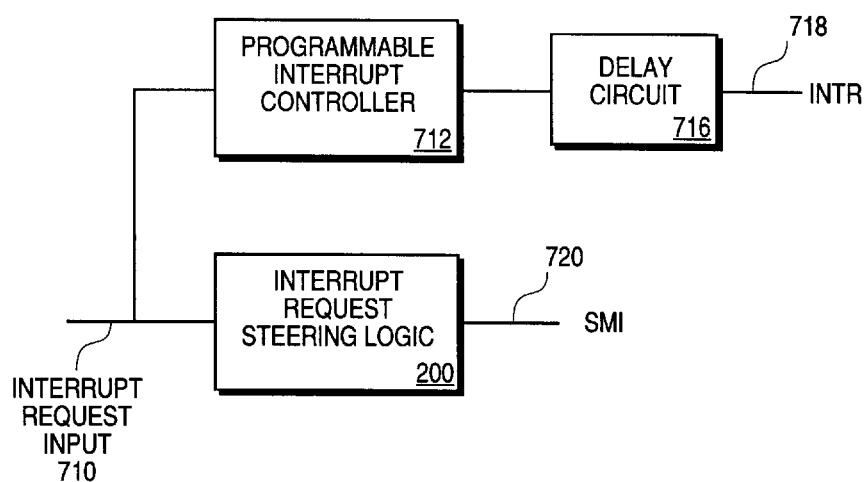
FIG. 4 illustrates the interrupt service routine nesting logic of one embodiment of the present invention.

Referring now to FIG. 4, in one embodiment of the present invention, some of the hardware interrupt request types are routed both to the interrupt request steering logic 200 via interrupt request input line 710 as well as directly to a programmable interrupt controller 712. The programmable interrupt controller 712 may be configured on peripheral controller 120 as part of the logic for other peripheral control functions 214 shown in FIG. 2 or it may be a discrete logic chip coupled to the processor 101 (FIG. 2).

In embodiments where the interrupt request steering logic 200 is configured on the same device as the programmable interrupt controller 712, the interrupt requests are routed to each of the above-mentioned functional blocks separately. The programmable interrupt controller 712 of this embodiment delays the generation of an interrupt with a delay circuit 716. This delay allows the interrupt request steering logic 200 to evaluate the interrupt request on interrupt request input line 710 and generate a different type of interrupt if required. For example, a certain interrupt request type, when evaluated by the interrupt request steering logic 200, might generate an SMI on output line 720. The same interrupt request type might also be routed directly to a separate programmable interrupt controller 712 which generates an INTR on output line 718. The delay circuit 716 delays the generation of the INTR for a fixed number of clock cycles allowing the SMI to be serviced first. When the SMI service routine has completed servicing the SMI caused by the interrupt request on interrupt request line 710, the pending INTR is serviced. In this manner, the interrupt service routines are nested such that a particular interrupt request 712 may be serviced by two interrupt service routines where required. The appropriate bits in the status register 314 (FIG. 3), one bit for the SMI service routine and one for the INTR service routine, are set and cleared as described above.

Figure 5:
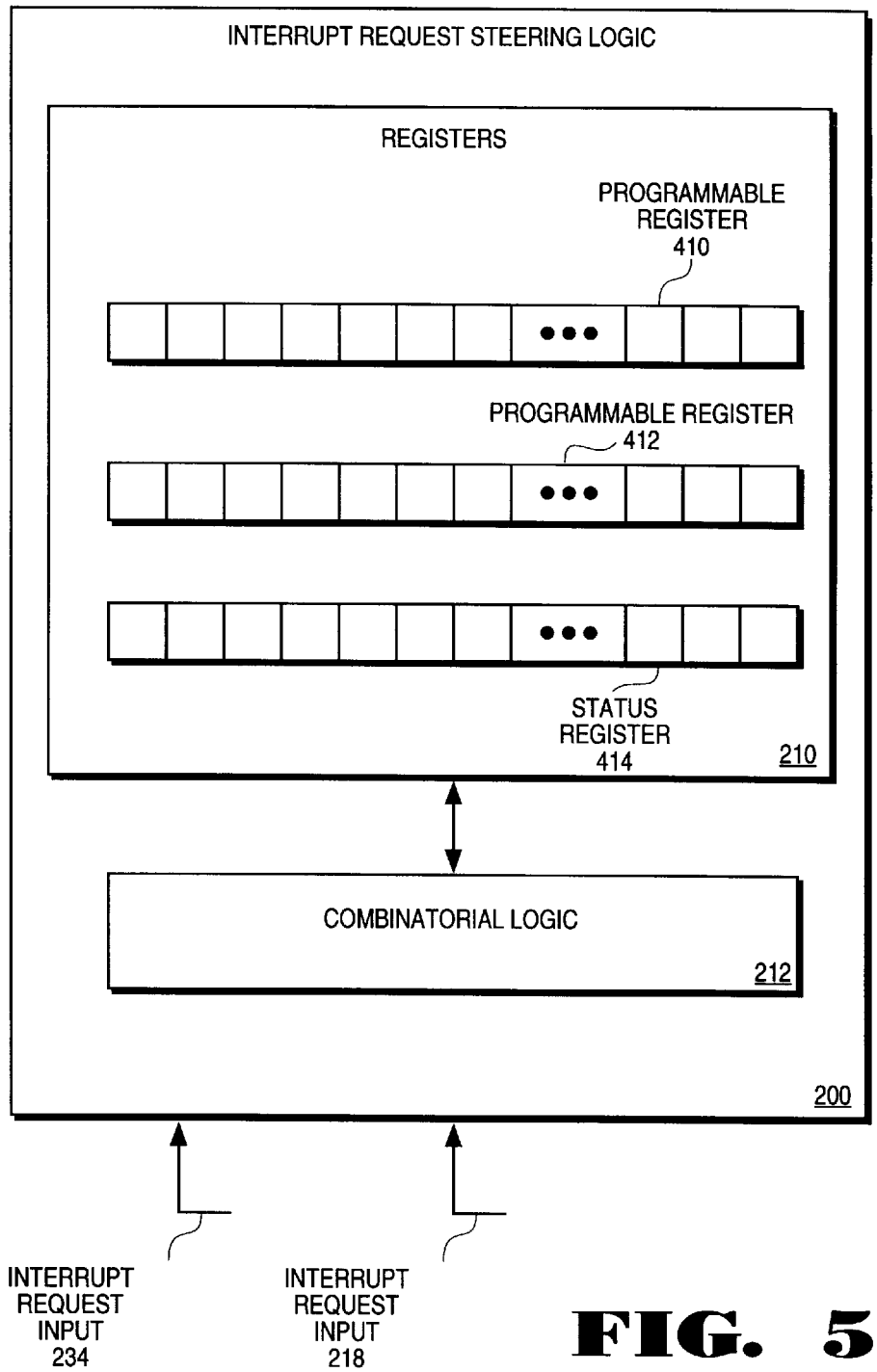
FIG. 5 is a block diagram of the interrupt request steering logic of an alternative embodiment of the present invention.

Alternative embodiments of the present invention comprise two or more programmable registers as a way to provide for selection between a larger number of interrupt types or to provide more flexibility in terms of assigning interrupt service routines to particular interrupt request types. FIG. 5 illustrates one such embodiment comprising two programmable registers 410 and 412. Programmable registers 410 and 412 comprise one or more bits per interrupt request type as described above with reference to the embodiment illustrated in FIG. 3. In one embodiment of the present invention, the computer system provides for three types of interrupts as described above: SMI, NMI and INTR, each of which invokes its own interrupt service routine. In this example, programmable register 410 indicates whether individual interrupt request types will be serviced by an operating system interrupt service routine (INTR or NMI) or a system management interrupt service routine (SMI). If a particular interrupt request is to be serviced by an operating system interrupt service routine, register 412 further indicates which operating system interrupt service routine, NMI or INTR, will be invoked. Status register 414 operates in the same manner as described above with reference to FIG. 3. Another embodiment comprising only one programmable register with two bits per possible interrupt request type may be used to implement the same interrupt steering scheme.

Although the embodiments discussed above are described with reference to specific numbers of registers, types of interrupts, register values and numbers of interrupt service routines, it will be apparent to one of ordinary skill in the art that these specific configurations are not required to implement the present invention. Other numbers of registers, interrupts, register values and interrupt types are considered to be within the scope of the present invention.

Figure 6:
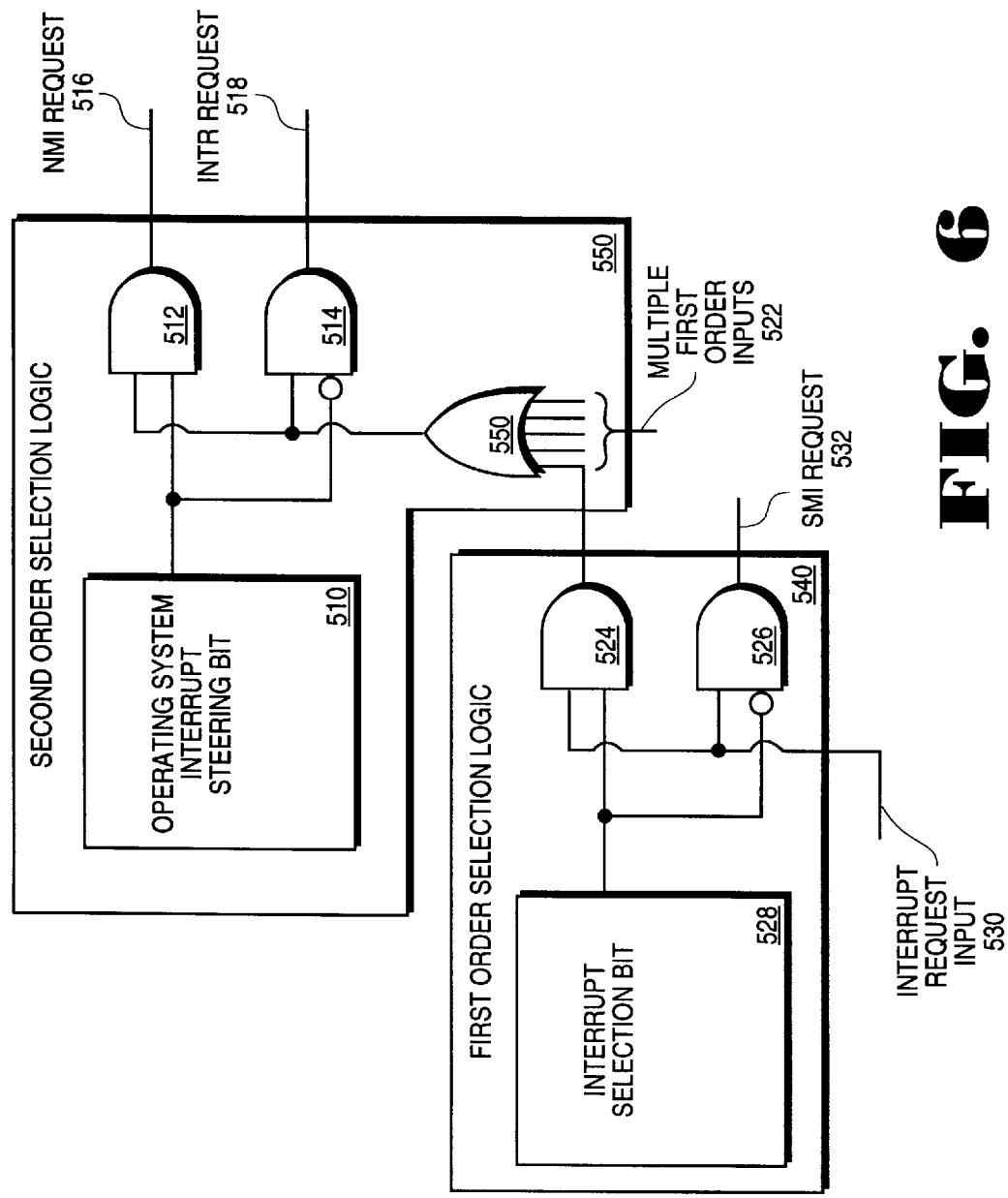
FIG. 6 is a logical diagram of the combinatorial interrupt selection logic of one embodiment of the present invention.

Referring now to FIG. 6, one embodiment of the combinatorial interrupt selection logic 212 (FIGS. 2, 3 and 5) of the present invention is illustrated. Interrupt selection bit 528 represents an individual bit from programmable register 310 (FIGS. 3 and 5). Interrupt selection bit 528 is programmed as described above to indicate whether the interrupt request type associated with that bit will be serviced by an operating system interrupt service routine or an alternate interrupt service routine such as the SMI service routine. When an active high (a logical "1") interrupt request input occurs on line 530, it is logically "ANDED" with the value in interrupt selection bit 528 through AND gate 524. The interrupt request input and the inverse of interrupt selection bit 528 are evaluated by AND gate 526.

In one embodiment, as illustrated in FIG. 6, if interrupt selection bit 528 is programmed to 0, output line 532 will be a 1, a system management interrupt (SMI) will be generated and the interrupt request on interrupt request input line 530 will be serviced by an SMI service routine. Alternatively, if interrupt selection bit 528 is programmed to 1, AND gate 524 will produce a 1 indicating that the interrupt request on interrupt request input line 530 will be serviced by an operating system service routine. In this case, OR gate 520 will produce a 1 which will be evaluated through AND gates 512 and 514 with the value of operating system interrupt steering bit 510 and its inverse. In the embodiment illustrated in FIG. 6, if operating system interrupt steering bit 510 is set to a 1, output line 516 will be a 1, generating a non-maskable interrupt (NMI) and interrupt request input 530 will be serviced by an NMI service routine.

Alternatively, if operating system interrupt steering bit 510 is set to a 0 in this case, output line 518 will be a 1, a maskable interrupt (INTR) will be output, and the interrupt request on interrupt request input line 530 will be serviced by an INTR interrupt service routine. It is important to note that operating system interrupt steering bit 510 may be one bit that is set for all operating system interrupts as described with reference to FIG. 3 or it may be one bit of a register that indicates which operating system interrupt handler is to be used for individual interrupt requests as described with reference to FIG. 5.

Interrupt selection bit 528 represents one bit of programmable register 310 (FIG. 3). In one embodiment of the present invention, first order interrupt service routine selection logic 540 is duplicated for each bit of programmable register 310. In the embodiment of the present invention discussed above with reference to FIG. 3, there is only one operating system interrupt steering bit 510 for all interrupt request types. In this case, second order interrupt selection logic 550 is not duplicated but used to determine the operating system interrupt service routine to be used by all interrupt request types. Multiple first order interrupt evaluation results 522 represent the outputs of first order interrupt selection logic 540 for other interrupt request types. Thus, second order interrupt selection logic 550 does not need to be duplicated for each bit of programmable register 310 (FIG. 3).

In an alternative embodiment described above with reference to FIG. 5, there is one operating system interrupt selection bit 510 for each interrupt request type. In this embodiment, both first order interrupt selection logic 540 and second order interrupt selection logic 550 are duplicated for each interrupt request type. In this embodiment, OR gate 520 is not required and the output from AND gate 524 is routed directly to AND gates 512 and 514.

Other embodiments of the present invention use additional programmable registers and/or additional individual steering bits to provide for selection between a greater number of possible interrupt types. In these alternative embodiments, the interrupt selection logic, such as first order interrupt selection logic 540, would be duplicated for other levels of selection.

The Method of the Present Invention

Figure 7:
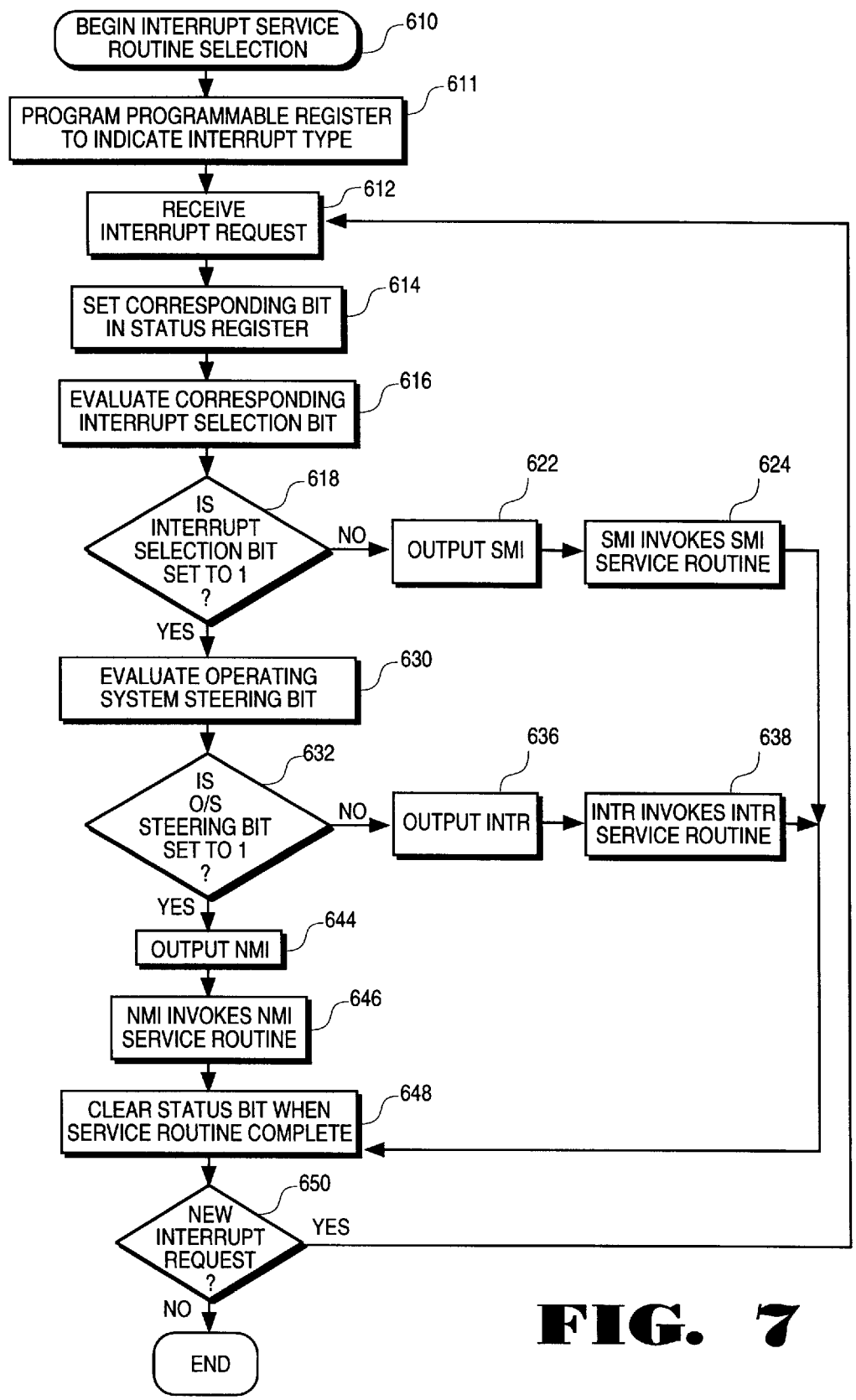
FIG. 7 is a flow diagram showing the method of one embodiment of the present invention.

Referring now to FIG. 7, the method of the present invention is described in more detail. The interrupt service routine selection of the present invention begins at block 610. At processing block 611, the system designer, BIOS programmer or other person programs the programmable register bits of the present invention to indicate which of the possible interrupt service routines should handle a particular interrupt request type. This step is usually done only once for a particular system. At step 612, the present invention receives an interrupt request. At step 614, in association with the computer system software, the present invention sets the status bit of the status register corresponding to the particular interrupt request type received. The present invention then evaluates the corresponding interrupt selection bit of the programmable register. At decision block 618, in one embodiment, if the interrupt selection bit is not programmed to a "1", the method of the present invention proceeds to processing block 622. A system management interrupt (SMI) is output which invokes a system management interrupt service routine in block 624. The method of the present invention then proceeds to block 648 where the status bit corresponding to the particular interrupt request type is cleared once the service routine has finished servicing the interrupt request.

Returning to decision block 618, if the appropriate interrupt selection bit of the programmable register is programmed to a "1", the method of the present invention proceeds to processing block 630 where the operating system interrupt steering bit is evaluated. The operating system interrupt steering bit may be a single bit that sets the operating system service routine to be used for all interrupt requests as described with reference to FIG. 3 or it may be the appropriate bit associated with that particular interrupt request type as described with reference to FIG. 5. In decision block 632, if the operating system interrupt steering bit is not programmed to a "1", the method of the current invention proceeds to block 636 where an INTR is output. In processing block 638, the INTR invokes the INTR service routine. The method of the present invention then continues to processing block 648 where the appropriate status bit is cleared by the INTR service routine once it has finished servicing the interrupt request.

Referring again to decision block 632, if the operating system interrupt steering bit is programmed to a "1", the method of one embodiment of the present invention continues on to processing block 644 where a non-maskable interrupt (NMI) is output. In processing block 646, the NMI invokes the NMI service routine which then clears the appropriate status bit in block 648 when the service routine is finished servicing the interrupt request. At decision block 650, if there is a new interrupt request, the present invention proceeds back to processing block 612 where the method of the present invention starts over again.

Whereas many alterations and modifications of the present invention will no doubt become apparent to a person of ordinary skill in the art after having read the foregoing description, it is understood that the particular embodiments shown and described by way of illustration are in no way intended to be considered limiting. Therefore, references to details of the individual embodiments are not intended to limit the scope of the claims which in themselves recite only those features regarded as essential to the invention.

Thus, a method and apparatus for selectively invoking a particular interrupt service routine for a particular interrupt request is described.

We claim:
1. A circuit for use in a computer system comprising:
   an interrupt request input; and a storage device for storing an interrupt selection bit, the interrupt selection bit being programmable to generate a interrupt request signal in response to a power management interrupt request the generated interrupt request signal being one of a system management interrupt (SMI) service request signal corresponding to a SMI service routine and at least one operating system request signal corresponding to an operating system service routine depending on the programming of the interrupt selection bit.

2. The circuit as set forth in claim 1 wherein said operating system service routine is one of a non-maskable interrupt (NMI) service routine or a maskable interrupt (INTR) service routine depending on the programming of an operating system interrupt steering bit stored in a second storage device.

3. The circuit as set forth in claim 1 further including a status register coupled to said interrupt request input, said status register to store a value indicating whether said power management interrupt request is being serviced.

4. The circuit as set forth in claim 2 further including combinatorial logic having a first input coupled to said interrupt request input, a second input coupled to said storage device and an output to communicate an interrupt to invoke a particular interrupt service routine in response to said power management interrupt request.

5. In a computer system, a circuit comprising:
   an interrupt request input;
   a first storage device to store an interrupt selection bit, the interrupt selection bit being programmable to generate an interrupt request signal in response to a power management interrupt request, the generated interrupt request signal being one of a system management interrupt (SMI) request signal corresponding to a SMI service routine and at least one operating system (OS) interrupt request signal corresponding to an OS service routine depending on the programming of the interrupt selection bit; and
   a second storage device to store said plurality of interrupt service routines.

6. The circuit as set forth in claim 5 wherein said operating system service routine is one of a non-maskable interrupt (NMI) service routine or a maskable interrupt (INTR) service routine depending on the programming of an operating system interrupt steering bit stored in a third storage device.

7. The circuit as set forth in claim 6 further including combinatorial logic having a first input coupled to said interrupt request input, a second input coupled to said first data store and an output to communicate an interrupt to invoke said particular interrupt service routine in response to said power management interrupt request.

8. In a computer system, a method for selectively invoking an interrupt service routine, said method comprising the steps of:
   receiving a particular type of power management interrupt request on an interrupt request line;
   reading a data value stored in a programmable data store corresponding to the particular power management interrupt request type; and
   invoking an interrupt service routine indicated by said data value to service said power management interrupt request, wherein when said data value is a first value said interrupt service routine is a system management interrupt (SMI) service routine and when said data value is a second value, said interrupt service routine is an operating system service routine.

9. The method as set forth in claim 8 wherein said operating system service routine is one of a non-maskable interrupt (NMI) service routine or a maskable interrupt (INTR) service routine.

10. The method as set forth in claim 8 further including the steps of:
    setting a first bit in a status register when said first interrupt service routine is invoked; and
    clearing said first status register bit when said first interrupt service routine is completed.

11. The method as set forth in claim 10 further including the steps of:
    communicating said power management interrupt request to an input of an interrupt controller; and
    invoking a second interrupt service routine to service said power management interrupt request.

12. The method as set forth in claim 11 further including the steps of:
    setting a second bit in said status register when said second interrupt service routine is invoked; and
    clearing said second status register bit when said second interrupt service routine is completed.

13. A computer system comprising:
    a bus;
    a processor coupled to said bus;
    an input/output component having a first output; and
    interrupt request steering logic including:
        a first interrupt request input coupled to said input/output component to receive power management interrupt requests of a plurality of types including a first power management interrupt request type and a second sower management interrupt request type,
        at least one programmable register bit associated with said first power management interrupt request type corresponding to a system management interrupt service routine and a second programmable register bit corresponding to an operating system service routine, and
        interrupt selection logic having a first input coupled to said interrupt request input, a second input coupled to said at least one programmable register bit, and an output, said output being selectively coupled to assert on said bus a first interrupt of said plurality of interrupts in response to said interrupt request input receiving a power management interrupt request of said first type, and a value programmed in said at least one programmable bit.

14. The computer system as set forth in claim 13 further including an interrupt bus coupled to said output of said input/output component for communicating power management interrupt requests.

15. The computer system as set forth in claim 13 wherein said operating system service routine is one of a non-maskable interrupt (NMI) service routine or a maskable interrupt (INTR) service routine.

16. The computer system as set forth in claim 13 further including a status register coupled to said output of said input/output component, said status register to store a value indicating whether said power management interrupt request is being serviced.

17. The computer system as set forth in claim 16 further including:
    an interrupt controller having an input coupled to said output of said input/output component, and
    a delay circuit having an input coupled to an output of said interrupt controller, said delay circuit and said interrupt controller invoking a second interrupt service routine to service said power management interrupt request.

18. The computer system as set forth in claim 14 further including combinatorial logic having a first input coupled to said interrupt bus, a second input coupled to said data store and an output to communicate an interrupt to invoke said interrupt service routine in response to said power management interrupt request.

19. A circuit for selectively outputting an interrupt signal, said circuit comprising:

an interrupt request input;

a programmable register for storing at least one programmable interrupt selection bit; and an interrupt steering logic circuit which outputs an interrupt request signal, the interrupt steering logic circuit using the interrupt request input and the at least one interrupt selection bit to select the interrupt request signal, said interrupt steering logic selecting from a group including at least one operating system interrupt request signal and a system management interrupt request signal.

20. The circuit of claim 19 wherein said interrupt selection logic is coupled to peripheral control logic within a peripheral controller.

* * * * *